March 8, 1955     H. VANVOR     2,703,833
RESISTANCE THERMOMETER
Filed Nov. 26, 1952
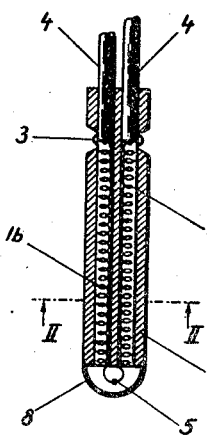
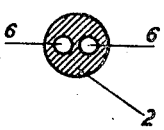
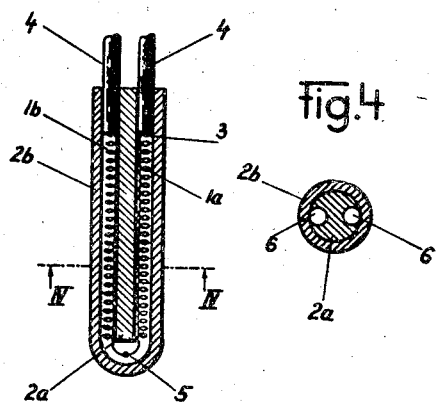
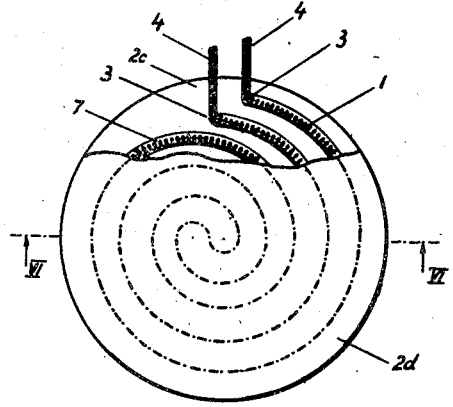
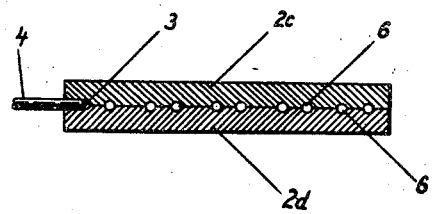
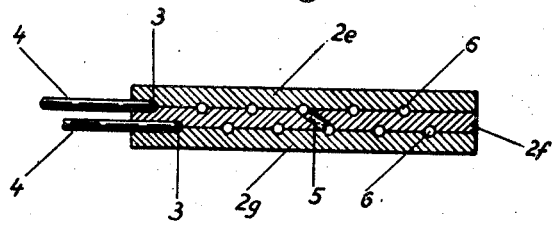
INVENTOR.
BY Herbert Vanvor
Klein T Hart
ATTORNEYS

United States Patent Office 2,703,833
Patented Mar. 8, 1955

2,703,833

RESISTANCE THERMOMETER

Herbert Vanvor, Hanau am Main, Germany, assignor to W. C. Heraeus G. m. b. H., Platinschmelze, Hanau (Main), Germany, a corporation of Germany Application November 26, 1952, Serial No. 322,601

Claims priority, application Germany December 6, 1951

10 Claims. (Cl. 201—63)

The present invention relates to resistance thermometers, and more particularly to improvements in the construction and support of the resistance element in such thermometers.

It is the general object of this invention to provide an improved resistance element for resistance thermometers having a measuring range up to about 1200° C., a very small volume, small heat capacity, temperature sensitivity without appreciable lag, and utmost dependability.

It is a further object of the invention to construct a resistance wire coil substantially immune to shock, free of tension and constant under temperature changes so that hysteresis will not cause false measurements.

It is an additional object of the invention to embed the resistance coil in a substance of such softness that shock or extension of the wire due to temperature changes will cause no tensions or pressures; a substance, furthermore, which is highly dependable even under very high temperatures and which has no electrolytic conductivity at high temperatures, it having been found that such conductivity may cause errors in temperature measurements.

Other objects of the present invention will become more fully apparent from the following detailed description of certain preferred features and embodiments thereof.

In known resistance thermometers, wire coils of suitable metal or alloy with a large temperature coefficient of high constancy, preferably platinum, are wound upon a ceramic supporting element and are protected against external influences by tubes of glass, quartz and the like, which are placed over the coil. To prevent movement of the coil, the windings are completely embedded in glass, glazed ceramic or in helical grooves in the support element.

It is true that such a construction of the resistance element will avoid position changes due to mechanical shock and thus will eliminate changes in the tension and irreversible changes in the resistance of the wire coil. However, it has the considerable disadvantage of limiting the use of the thermometer to temperatures not exceeding about 550° C. since the conductivity of glass or glazed ceramic iincreases considerably above this temperature and thus falsifies resistance measurements.

Also, if the wire coil is embedded in helical grooves of the support element, this element must be relatively big so that the heat capacity of the thermometer is undesirably high. In addition, if the wire coil is embedded in glass or glazed ceramic or in grooves of the support element, it is forced to participate in the thermal expansion of the glass or support element since these materials are very hard and are not resilient. This leads to different resistance values at the same temperature due to hysteresis effects, depending on whether measurement is taken at increasing or decreasing temperature. The error could be several tenths of centigrades, for instance, if the wire coil is embedded in glass.

The objects of the present invention are accomplished and the disadvantages of known resistance thermometers are overcome prmarily by constructing the resistance element in a helix of exceedingly small diameter and with its windings very closely adjacent one another. The diameter of the helix should be no more than 1.5 to 7 times the diameter of the wire, preferably two to five times the wire diameter, and the distance between the helix windings should be about equal to the wire diameter.

A tightly wound wire coil in accordance with the invention has great stiffness, occupies very little space and can be suspended almost freely without detrimental mechanical shock.

In accordance with another feature of this invention, the resistance coil is suspended or placed in tightly fitting capillaries of a ceramic support element so that the resilient coil is independent of the thermal expansion and changes in volume of the support material.

According to another feature of the invention, the interior of the tightly wound resistance coil is filled with a material which, while compact and cohesive, is about as soft as chalk and whose hardness, measured on the Mohs' scale of hardness, does not exceed 3, preferably 2. Such a filling will avoid the tensions and hysteresis effects caused by very hard embedding masses such as glass or glazed ceramic, on the one hand, and will also improve the insufficient support of the coil afforded by very loose materials, such as glass powder. If desired, the relatively soft filler proposed by the invention may also fill the spaces between the coil windings and even the entire space of the capillaries carrying the coil.

The filler for the resistance coil proposed by the present invention is distinguished from the known embedding substances inasmuch as it has neither the hardness nor the density of sintered alumina, nor the smoothness or conductivity at high temperatures of the usual glazed ceramics and glass, while, at the same time, being cohesive, of fixed form and resistant to shock. A suitable material is, for instance, a batch of alumina with quartz and calcium oxide, sintered at a temperature of about 1000° C. and having, therefore, the form of a sintered biscuit. All chemically bound water is eliminated from such a mass but it is relatively porous and soft so that the mechanical tensions and pressures upon the coil are much smaller than with a hard embedding substance.

Suitable materials for the suport element and the covering member for the resistance wire coil include chemically indifferent, non-conductive and highly heat-resistant substances, preferably pure oxides, such as magnesium oxide or sintered aluminum oxide ($Al_2O_3$).

The various objects, features and advantages of the present invention will be more fully understood when reference is had to the following detailed description taken in conjunction with the accompanying drawing of certain now preferred embodiments, it being understood that this is in no way intended in a limitative sense.

In the drawing,

Fig. 1 is a side view, partly in section, of a resistance thermometer according to the invention;

Fig. 2 is a section along the line II—II of Fig. 1;

Fig. 3 is a side view, partly in section, of another embodiment of the invention;

Fig. 4 is a section along the line IV—IV of Fig. 3;

Fig. 5 is a top view of a different embodiment of the invention;

Fig. 6 is a section along line VI—VI of Fig. 5; and

Fig. 7 is a section of yet another embodiment of the invention.

Referring now to the drawing, Figs. 1–4 show a rod-like resistance thermometer while Figs. 5–7 show a disc-like thermometer. In Fig. 1, there is shown a thin rod 2 having a diameter of, for instance, 1–2 mm., and a length of about 5 cm., for example. The rod is made of a high heat-resistant oxide, such as aluminum oxide. The two halves 1a and 1b of the very tightly wound resistance coil are positioned in two adjacent straight capillaries 6 which are parallel to each other. Coil 1a, 1b is made of very fine wire, for example of pure platinum. The outer ends of the wire coil are soldered to thicker conductors 4 which fit tightly into the capillaries and are attached in a suitable manner to the capillaries. For this purpose, rod 2 may be notched at 3 to the capillary walls so that the resistance wire coils which are soldered to the ends of conductors 4 may be fixed to the capillaries by applying some soldering material at 3. Conductors 4 form a substantially air-tight joint with the capillaries. Wire coils 1a and 1b are soldered together at 5 at their interior ends and a glass or glazed ceramic cap 8 is placed thereover to prevent air from entering the capillaries. The resistance wire coils are freely suspended in capillaries 6 and are held in position only by their own stiffness. Even considerable shock does not effect any substantial changes in their position and/or tension.

If the thermometer is to be used at temperatures above 700° C., it may be preferred to fill the interior space 7 of the coils with a soft mass, as hereinabove described, such as sintered alumina and the like.

According to the embodiment of Fig. 3, the thermometer comprises an inner or core member 2a and a cylindrical outer or sleeve member 2b which is closed at one end. Capillaries 6 are formed by longitudinal grooves in the core member. Although only two grooves are shown, it is possible to form the core with four or even more grooves. The parts of resistance wire coil 1 are placed in the parallel grooves. The inner ends of the wire coils are soldered together at 5 and their outer ends are soldered to conductors 4 at 3, whereupon sleeve 2b is placed over core 2a and cemented thereto with an air-tight joint. In this embodiment of the thermometer, a soft filler may be placed in the interior space 7 of the coil, as described in connection with Fig. 1.

Figs. 5–7 show embodiments of the invention particularly adapted for temperature measurements in quiescent media. In these embodiments, the support element for the resistance coil has the form of a flat disc. As shown in Figs. 5 and 6, the ceramic support consists of two discs 2c and 2d which are provided on their interior surfaces with helical grooves. When the two halves are placed over each other (see Fig. 6), the grooves form capillaries 6 adapted to receive the resistance coils 1. The helix preferably has two branches, as shown, so that two coil parts are arranged side by side. As in the rod thermometers shown in Figs. 1–4, the resistance coil ends are soldered to conductors 4 at 3 and, if desired, the space 7 within the coils may be filled with the soft filler material hereinabove described.

Fig. 7 shows a slightly different disc-like thermometer wherein a center disc 2f is provided on both surfaces with grooves in the form of a one-branched helix and outer discs 2e and 2f are provided with appropriate grooves to form capillary 6 when the three discs are fitted together. In this embodiment, the two parts of the resistance coil are positioned on either side of the center disc and are soldered together at 5 in a bore provided in center disc 2f.

The resistance thermometers of the present invention may be manufactured in accordance with the following method although other methods may occur to those skilled in the art and the invention is not limited to such manufacturing methods as are herein described.

Referring to the thermometer shown in Fig. 1, for instance, the two parts 1a and 1b of the resistance coil are first wound on a thin glass or metal mandrel so that the diameter of the coil does not exceed 1.5 to 7 times the diameter of the wire and the distance between the windings about equals the wire diameter. The wound coil is then removed from the mandrel and is soldered to conductor 4 at one of its ends. The coil is then sucked into capillary 6 by means of a water-jet vacuum pump. After the coils are placed in the capillaries, a small amount of solder is applied in notches 3, which cut through the support element 2 to the capillaries, thereby fixing the coils to the support element and obtaining an air-tight closure between electrodes 4 and the walls of the capillaries. If the filler mass is to be placed in spaces 7, an aqueous mixture or pure alumina, quartz and lime may be sucked into these spaces, for instance by means of a water-jet vacuum pump. The thermometer is then dried and sintered at temperatures up to a maximum of 1000° C. so that all the water is removed and the porous sintered biscuit of the invention is obtained. The two parts 1a and 1b of the coil are then welded together at 5 and soldered, whereupon a glazed ceramic cap 8 is placed over the welded and soldered ends of the coils to protect them from air.

After the thermometer is thus constructed, it is submitted to an aging process which is well known in the art and consists primarily in alternately heating the thermometer at high temperatures, for instance 750° C. in the case of platinum resistance elements.

The resistance thermometers of the present invention increase the range of measurement up to about 1200° C., the upper temperature limit being determined only by the crystallization of the resistance material. In the case of platinum, this commences at about 750° C. By using high temperature resistant oxides as material for the support element of the resistance coils and by avoiding hard embedding substances for the coils, the invention also eliminates the electrolytic conductivity of the conventional glazed ceramics at high temperatures, which leads to false measurements due to tension and resistance changes of the resistance material. Also, it is of considerable advantage that the volume of the resistance thermometers constructed in accordance with the invention may be very small. In view of the minimal heat capacity, the accuracy and sensitivity of the thermometers are considerably increased. A considerable part of the tension changes usually caused by shock is absorbed by the internal stiffness of the tightly wound wire coils of the invention and the soft embedding mass proposed by the invention exerts only a relatively small pressure on the resistance element. The finished thermometers have the additional advantage that they are insensitive to mechanical shocks usually unavoidable during packing and transportation and they show no changes in their resistance characteristics.

While the invention has been described in conjunction with certain now preferred embodiments and a preferred method of manufacture has also been described, it is to be clearly understood that various modifications thereof may occur to those skilled in the art without departing from the scope and spirit of the invention as defined in the appended claims.

What is claimed is:

1. In combination, a resistance thermometer for measuring high temperatures, comprising a ceramic cylindrical core member having a high thermal resistance and having a plurality of longitudinal grooves along its surface, a high temperature resistant ceramic tube closed at one end fitted tightly over said core member and joined thereto in an air-tight manner, the grooves of the core member and the wall of the tube forming a plurality of capillaries, a fine wire resistance element consisting of a plurality of wire helices, each one suspended in one of said capillaries, and each helix having a diameter between 1.5 and 7 times the diameter of the wire and having its windings spaced apart a distance not substantially exceeding the wire diameter, a biscuit-baked, porous ceramic batch which is cohesive and of fixed form but whose hardness does not exceed 2, measured by Mohs' scale of hardness, filling at least part of each capillary, a connecting electrode fixedly attached to the outer end of each wire helix, each connecting rod forming a substantially air-tight joint with the respective capillary, the inner ends of the wire helices being fixedly connected with each other outside the capillaries and adjacent the closed end of the ceramic tube.

2. Resistance thermometer as defined in claim 1, wherein said core member is provided with at least two parallel longitudinal grooves.

3. Resistance thermometer as defined in claim 1, wherein said core member is provided with a helical groove.

4. In combination, a resistance thermometer for measuring high temperatures, comprising a ceramic supporting rod having a high thermal resistance and having two substantially parallel, longitudinal capillaries therein, a fine wire resistance element consisting of two wire helices, each one suspended in one of said capillaries, and each helix having a diameter between 1.5 and 7 times the diameter of the wire and having its windings spaced apart a distance not substantially exceeding the wire diameter, a biscuit-baked, porous ceramic batch which is cohesive and of fixed form but whose hardness does not exceed 2, measured by Mohs' scale of hardness, filling at least part of each capillary, a connecting electrode fixedly attached to the outer end of each wire helix, each connecting electrode forming a substantially air-tight joint with the respective capillary, the inner ends of the helices being fixedly connected with each other outside the capillaries, and a high temperature resistant cap providing a substantially air-tight seal over said inner ends of the helices and said capillaries.

5. A resistance thermometer for measuring high temperatures, comprising a first disc having a two-branched helical groove in one of its flat surfaces, a second disc having a two-branched helical groove in one of its flat surfaces, the two discs being of a ceramic having a high thermal resistance and being substantially air-tightly joined together along their grooved surfaces, the registering grooves forming a capillary, a fine wire resistance element consisting of a wire helix having a diameter between 1.5 and 7 times the diameter of the wire and having its windings spaced apart a distance not substantially exceeding the wire diameter, the resistance element being placed in the capillary, and a connecting electrode fixedly attached to the outside ends of the helix.

6. A resistance thermometer for measuring high temperatures, comprising a center disc having a helical groove in each of its flat surfaces, two outer discs having registering helical grooves in one of their flat surfaces, the discs being of a ceramic having a high thermal resistance and the two outer discs being substantially airtightly joined along their grooved surfaces to the center disc, the registering grooves forming two helical capillaries, a fine wire resistance element consisting of two wire helices placed in each capillary, each helix having a diameter between 1.5 and 7 times the diameter of the wire and having its windings spaced apart a distance not substantially exceeding the wire diameter, a connecting electrode fixedly attached to the outer end of each wire helix, the inner ends of the helices being fixedly connected with each other outside the capillaries and in a connecting bore provided in the center disc.

7. A resistance thermometer for measuring high temperatures, comprising a support element resistant to high temperatures, at least one capillary in said support element, a fine wire resistance element positioned in the capillary and having the form of a helix whose diameter is between 1.5 and 7 times the diameter of the wire, a connecting electrode fixedly attached to one end of said resistance element, and a sintered mixture of alumina, calcium oxide and quartz whose hardness does not exceed 3, measured by Mohs' scale of hardness, filling the interior of the resistance element.

8. In a resistance thermometer for measuring high temperatures, comprising a compact ceramic support element of high thermal resistance with at least one capillary therein, a fine wire resistance element positioned in the capillary and having the form of a helix whose diameter is between 1.5 and 7 times the diameter of the wire and whose windings are spaced apart a distance substantially equal to the wire diameter, and a connecting electrode fixedly attached to each end of the said resistance element with substantially airtight closure of the capillary: a biscuit-baked, porous ceramic batch which is cohesive and of fixed form but whose hardness does not exceed 2, measured by Mohs' scale of hardness, filling at least part of the capillary.

9. A resistance thermometer as defined in claim 8, wherein the interior of the resistance element helix is filled with the biscuit-baked, porous ceramic batch.

10. A resistance thermometer as defined in claim 8, wherein the interior of the resistance element helix, the spaces between the helix windings and the space between the capillary wall and the helix are filled with the biscuit-baked porous ceramic batch.

References Cited in the file of this patent

UNITED STATES PATENTS

| 441,488 | Hensley et al. | Nov. 25, 1890 |
| 2,131,065 | Obermaier | Sept. 27, 1938 |
| 2,337,202 | Jones | Dec. 21, 1943 |
| 2,349,614 | Denisoff | May 23, 1944 |

FOREIGN PATENTS

| 475,667 | Great Britain | June 6, 1936 |